(12) United States Patent
Kaplan et al.

(10) Patent No.: US 9,407,475 B2
(45) Date of Patent: Aug. 2, 2016

(54) SYSTEM AND METHOD FOR TREE-SEARCH ENHANCEMENT BY METRIC PREDICTION BASED ON INCOMPLETE PATHS IN SOFT OUTPUT MIMO DECODER

(71) Applicant: Ceva D.S.P. Ltd., Herzlia Pituach (IL)

(72) Inventors: Zeev Kaplan, Karmiel (IL); Noam Dvoretzki, Hod HaSharon (IL); Eitan Hai, Ramat Gan (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 0 days.

(21) Appl. No.: 14/341,869

(22) Filed: Jul. 28, 2014

(65) Prior Publication Data

US 2015/0222457 A1    Aug. 6, 2015

Related U.S. Application Data

(60) Provisional application No. 61/935,001, filed on Feb. 3, 2014.

(51) Int. Cl.
| | |
|---|---|
| *H04L 27/06* | (2006.01) |
| *H04L 25/03* | (2006.01) |
| *H04B 7/02* | (2006.01) |

(52) U.S. Cl.
CPC .......... *H04L 25/03242* (2013.01); *H04B 7/02* (2013.01); *H04L 25/03191* (2013.01); *H04L 2025/03426* (2013.01)

(58) Field of Classification Search
CPC ....................................................... H04L 1/00
USPC ....................................................... 375/341
See application file for complete search history.

(56) References Cited

U.S. PATENT DOCUMENTS

| | | | | |
|---|---|---|---|---|
| 6,654,929 | B1 * | 11/2003 | Kamada ...................... | 714/795 |
| 7,720,169 | B2 * | 5/2010 | Reuven et al. ............... | 375/267 |

(Continued)

FOREIGN PATENT DOCUMENTS

| | | |
|---|---|---|
| EP | 2341676 | 7/2011 |
| WO | WO 2009/109394 A2 | 9/2009 |

(Continued)

OTHER PUBLICATIONS

U.S. Appl. No. 14/168,397, filed Jan. 30, 2014, Dvoretzki et al.

(Continued)

*Primary Examiner* — Lihong Yu
(74) *Attorney, Agent, or Firm* — Pearl Cohen Zedek Latzer Baratz LLP

(57) ABSTRACT

A method and system for soft output multiple-input-multiple-output (MIMO) decoding may include generating a tree-graph based on: MIMO rank, number of bits per layer, and type of modulation, wherein the tree-graph comprises a root node, leaf nodes, nodes, and branches connecting the nodes; performing sphere decoding by determining a radius covering a subset of nodes within said tree-graph; managing, based on the sphere decoding, tables comprising metrics and counter metrics usable for log likelihood ratio (LLR) generation; predicting, based on a specified prediction scheme, counter metrics for paths in the tree-graph that comprise nodes and branches out of the determined radius; and updating the tables comprising the counter metrics with the predicted counter metric, in a case that the predicted counter metrics are better in maximum likelihood terms than the determined counter metrics.

19 Claims, 6 Drawing Sheets

(56) References Cited

U.S. PATENT DOCUMENTS

| | | | |
|---|---|---|---|
| 8,005,170 | B2 | 8/2011 | Lee et al. |
| 8,018,828 | B2 | 9/2011 | Song et al. |
| 8,279,977 | B2 | 10/2012 | Rayala |
| 8,559,543 | B1 | 10/2013 | Lee et al. |
| 2005/0135498 | A1 | 6/2005 | Yee |
| 2009/0034664 | A1 | 2/2009 | Masui et al. |
| 2009/0303944 | A1* | 12/2009 | Fukuoka et al. ............. 370/329 |
| 2011/0044407 | A1 | 2/2011 | Chang et al. |

FOREIGN PATENT DOCUMENTS

| | | |
|---|---|---|
| WO | WO 2010/005606 A1 | 1/2010 |
| WO | WO 2010/112506 | 10/2010 |

OTHER PUBLICATIONS

Burg et al. "VLSI Implementation of MIMO Detection Using the Sphere Decoding Algorithm" IEEE Journal of Solid-State Circuits, IEEE Service Center, Piscataway, NJ, USA vol. 40, No. 7, Jul. 1, 2005; p. 1566-1577.

Azzam et al., "Reduction of ML Decoding Complexity for MIMO Sphere Decoding, QOSTBC, and OSTBC", pp. 18-25, DOI: 10.1109/ITA.2008.4601014 "IEEE", In proceeding of: Information Theory and Applications Workshop, Feb. 2008.

Kozlowski et al., "Phased array antennas in MIMO receiver", Journal of Telecommunications and Information Technology, Jan. 2007, pp. 26-29.

3GPP Organizational Partners, "3rd Generation Partnership Project; Technical Specification Group Radio Access Network; Evolved Universal Terrestrial Radio Access (E-UTRA); Physical Channels and Modulation (Release 8)" May, 2009, pp. 1-83.

Paker et al., "A low cost multi-standard near-optimal soft-output sphere decoder: Algorithm and architecture", IEEE, Design, Automation & Test in Europe conference & exhibition, pp. 1402-1407, Mar. 8, 2010.

Studer et al., "Soft-output sphere decoding: Performance and Implementation Aspects", IEEE, Signals, Systems and Computers 2006, Fortieth Asiloma conference, pp. 2071-2076, Oct. 1, 2006.

Bhagawat et al., "Systolic like soft-detection architecture for 4×4 64-QAM MIMO systems", IEEE, Design, Automation & Test in Europe conference & exhibition 2009, pp. 870-873, Apr. 20, 2009.

Jian et al., "A low complexity soft-output QRD-M algorithm for MIMO-OFDM systems", IEEE, Wireless Communications networking and mobile computing (WICOM) 2010 $6^{TH}$ International conference, IEEE, pp. 1-5, Sep. 23, 2010.

* cited by examiner

SYSTEM AND METHOD FOR TREE-SEARCH ENHANCEMENT BY METRIC PREDICTION BASED ON INCOMPLETE PATHS IN SOFT OUTPUT MIMO DECODER

CROSS REFERENCE TO RELATED APPLICATIONS

This application is a non-provisional patent application claiming benefit from U.S. provisional patent application Ser. No. 61/935,001 filed on Feb. 3, 2014 and incorporated herein by reference in its entirety.

FIELD OF THE INVENTION

Embodiments of the present invention relate generally to the field of radio frequency (RF) multiple-input-multiple-output (MIMO) systems and more particularly to implementing soft output decoding in such systems.

BACKGROUND OF THE INVENTION

An N×M Multiple-Inputs-Multiple-Outputs (MIMO) system 100 is shown in FIG. 1, which includes multiple M transmitting antennae 102 sending signals to multiple N receiving antennae 104. The M transmit antennae 102 may transmit over a channel data streams represented by a transmit vector $\bar{s}$ and received by the receiving antennae represented by a received vector $\bar{y}$. The relationship between the transmitted vector $\bar{s}$ and the received vector $\bar{y}$ defines the channel information, which may be represented by a channel matrix H as follows:

$$\bar{y} = H \cdot \bar{s} + \bar{n}$$

The channel matrix H includes entries $h_{ij}$ that represent the relationship between the signals transmitted from the $j^{th}$ transmitter antenna 102 to the signal received by the $i^{th}$ receiver antenna 104. The dimension of the transmit vector $\bar{s}$ is M×1, the dimension of the received vector $\bar{y}$ is N×1, the dimension of the channel matrix H is N×M and $\bar{n}$ is a signal noise vector of dimension N×1 for N×M MIMO system 100.

A MIMO decoder 106, e.g., a maximum likelihood (ML) decoder, may decode a received signal $\bar{y}$ by determining its corresponding transmit signal $\bar{s}$ for a given channel matrix H. Each vector $\bar{s}$ may be a vector with a number of elements equal to the number of transmit antennae 102, M, and each vector $\bar{y}$ may be a vector with a number of elements equal to the number of receive antennae 104, N. In one example of a 4×4 MIMO channel matrix H (N=M=4), each vector $\bar{s}$ and $\bar{y}$ may be a 4-vector with 4 elements.

A demultiplexer 108 may modulate transmitted signals $\bar{s}$, for example, using quadrature amplitude modulation (QAM) mappers with 4, 16 or 64 QAM or any other type of modulation. Modulation may define a number of possible or candidate values for each vector element. For example, each element in 4 QAM or quadrature phase-shift keying (QPSK) has 4 possible values (e.g. defined by 2 bits–$2^2=4$ complex values (1,1), (−1,1), (−1,−1), (1,−1)), each element in 64 QAM has 64 possible values (e.g. 6 bits), etc. Decoder 106 may evaluate a total number of different transmit vectors $\bar{s}$ equal to the number of possible candidate modulation values to the power of the number of transmit antennae, M, to find the most likely solution for each received signal $\bar{y}$. For example, 64 QAM, using 4×4 MIMO there are $64^4$ (16.8 million) different candidate 4-vectors $\bar{s}$. A "tone" of data refers, e.g., in OFDM modulation, to the data transmitted/received over each frequency sub-carrier, which may be represented by all candidate transmit vectors $\bar{s}$ used to decode a single received signal $\bar{y}$. For example, the (long term evolution) LTE advanced communication standard Cat.7 supports 12.6 million tones of data per second, or 12.6 million×16.8 million (211.68 trillion) candidate transmit vectors $\bar{s}$ to decode the signals $\bar{y}$ received during each second of communication.

Due to the enormous rate at which information may be decoded, there is a great need in the art for providing a system and method that manages decoding signals in MIMO systems at an acceptable complexity while maintaining performance.

SUMMARY OF THE INVENTION

Embodiments of the present invention provide performance enhancement for soft output MIMO decoding, without increasing the complexity of the search, in cost of minor additions of memory and calculations. Embodiments of the present invention may include generating a tree-graph of bits based on: MIMO rank of the receiver, number of bits per layer, and type of modulation, wherein the tree-graph comprises a root node, leaf nodes, nodes, and links or branches connecting the nodes; performing sphere decoding by determining a radius covering a subset of nodes within said tree-graph; managing, based on the sphere decoding, tables comprising metrics and counter metrics usable for log likelihood ratio (LLR) generation; predicting, based on a specified prediction scheme, counter metrics for paths in the tree-graph that comprise nodes and branches out of the determined radius; and updating the tables comprising the counter metrics with the predicted counter metric, in a case that the predicted counter metrics are better in maximum likelihood terms than the determined counter metrics.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
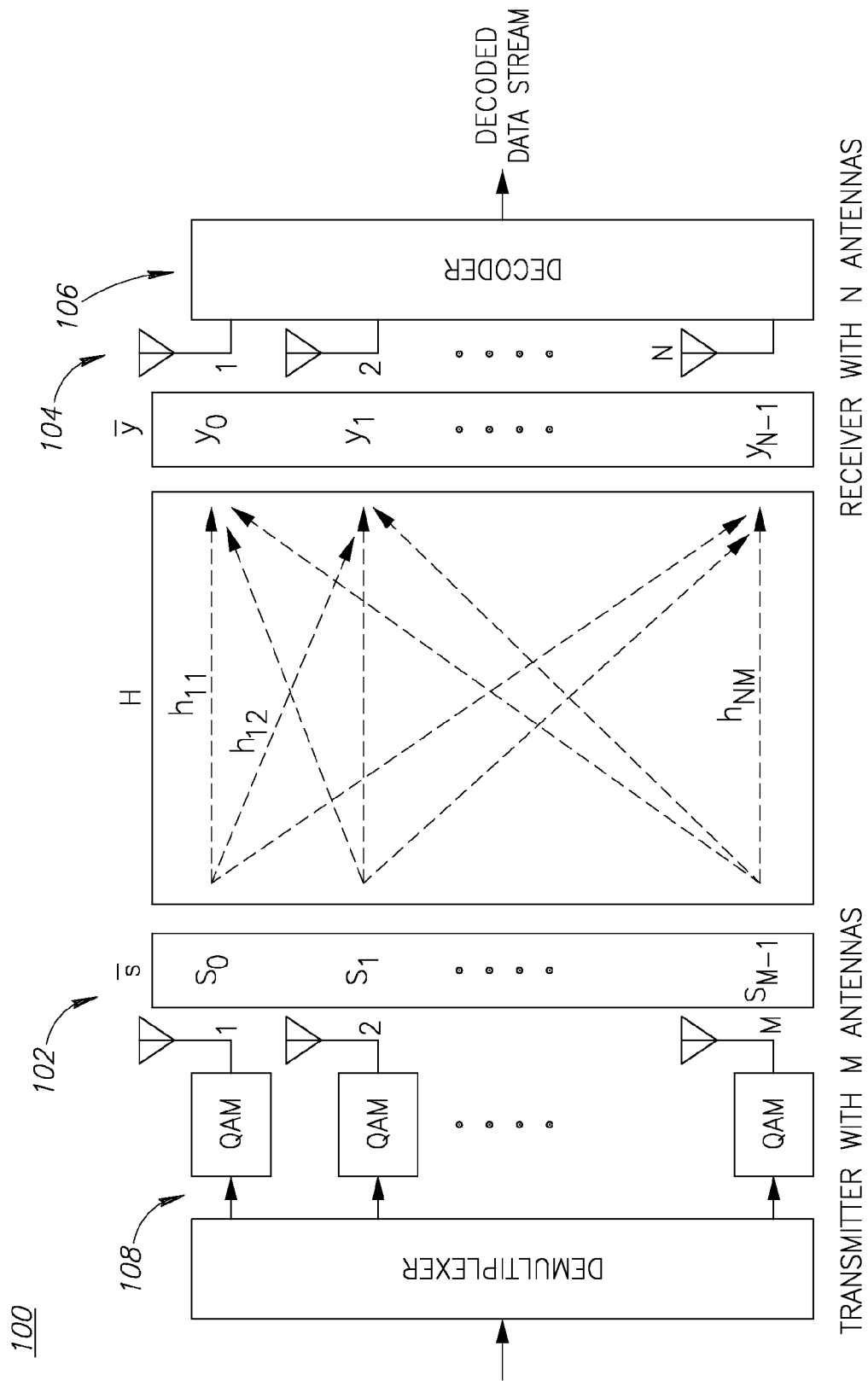
FIG. 1 is a schematic illustration of a N×M MIMO system in accordance with the prior art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices A maximum likelihood decoder (e.g. decoder 106 of FIG. 1) may decode each received signal $\overline{y}$ by searching a tree graph for corresponding source signals $\overline{s}$ for a given channel matrix H. Each tree graph may represent all possible or candidate transmit vectors $\overline{s}$ for a single received signal $\overline{y}$, e.g., one tone of data.

Figure 2A:
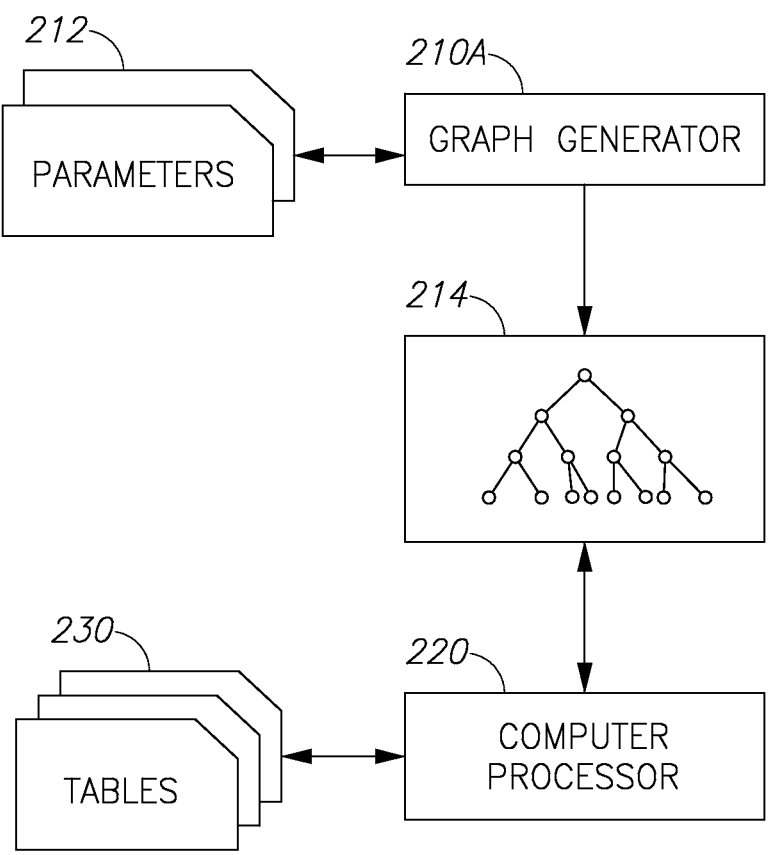
FIG. 2A is a block diagram illustrating a system in accordance with some embodiments of the present invention.

FIG. 2A is a block diagram illustrating a system 200A for soft output multiple-input-multiple-output (MIMO) decoding, in accordance with some embodiments of the present invention. System 200A may include a graph generator 210A configured to generate a tree-graph 214 based on a plurality of parameters 212 that characterize a (MIMO) communication system (not shown). Parameters 212 may include (but are not limited to) the following metrics: MIMO rank, number of bits per layer, and type of modulation. Tree-graph 214 may be a data structured having a root node, leaf nodes, nodes, and branches connecting the nodes.

System 200A may further include a computer processor 220 configured to: perform sphere decoding by determining a radius covering a subset of nodes within tree-graph 214; manage, based on the sphere decoding, tables 230 that include metrics and counter metrics usable for log likelihood ratio (LLR) generation; predict, based on a specified prediction scheme, counter metrics for paths in tree-graph 214 that may include nodes and branches out of the determined radius; and update tables 230 that may include the counter metrics with the predicted counter metric, in a case that the predicted counter metrics are better in maximum likelihood terms than the determined counter metrics. Processor 220 may be or perform the operations of modules such as graph generator 210A and other modules. Processor 220 may be configured to perform methods as discussed herein by, for example, executing software or code stored in memory.

In some embodiments graph generator 210A may be implemented by computer processor 220. Tables 230 may be data structures that are being updated ("managed") in real-time by computer processor 220 based on incoming outputs of the sphere decoder.

Figure 2B:
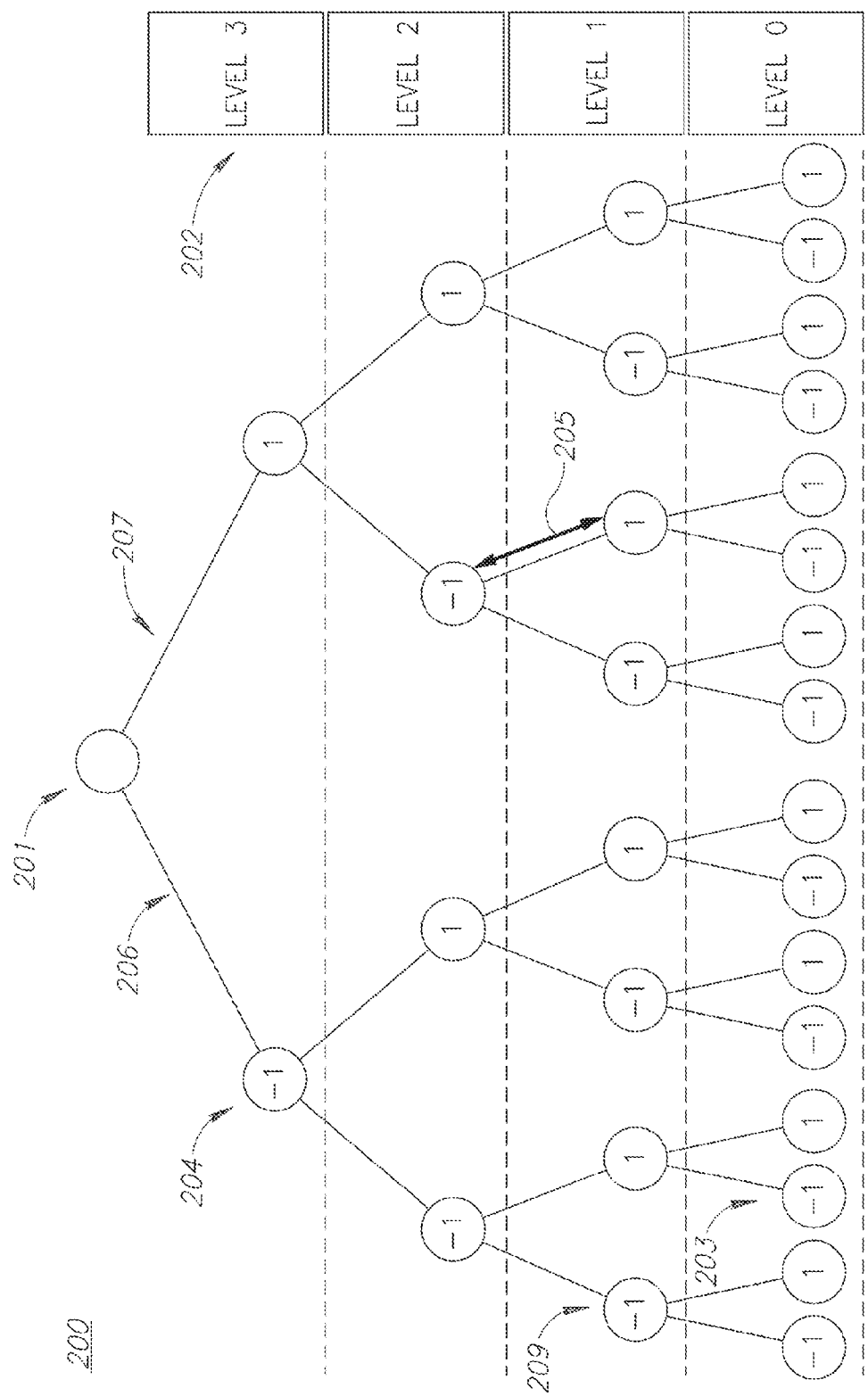
FIG. 2B is a schematic illustration of a tree graph used to decode a received signal $\bar{y}$ modulated in BPSK in a 4×4 MIMO system in accordance with an embodiment of the invention.

FIG. 2B is a diagram illustrating a tree graph 200 in accordance with some embodiments of the present invention. Tree graph 200 may be organized into a plurality of levels 202 (e.g. 0-3) including a plurality of nodes 204 (e.g. junctions) each determining a bit. Tree graph 200 has one root node 201 connected via branches (e.g., 206 and 207) to other nodes. Each of levels 202, e.g. level 1, may define a different candidate transmit vector $\overline{s}$ element and each node (e.g. node 209) in that level may define the different candidate values for that transmit vector $\overline{s}$ element. The number of levels 202, M, in a tree graph 200 may be equal to the number of different transmit antennae 102 in FIG. 1 (e.g. M levels in an N×M MIMO system) and each parent node 204 in an ith level of tree graph 200 (where i is an integer between 1 and M) splits into a number candidate values, $P_i$, of child nodes 204 in the i−1th level (of 0-3) of tree graph 200 equal to the modulation number (e.g., P=64 for 64 QAM, P=4 for QPSK). Accordingly the total number of nodes 204 (and associated candidate transmit vectors $\overline{s}$) in tree graph 200 is equal to the total number of candidate nodes in the tree: $\Pi_1^M P_i$. The nodes on the lowest level are called leafs or leaf nodes 203.

For example, a tree graph for a 4×4 MIMO system that includes 4 levels (0-3), where each level has 64 nodes representing 64 possible values of each of the 4 element of $\overline{s}$ has a total of 64^4 (16.8 million) candidate transmit vectors $\overline{s}$ for a single $\overline{y}$ vector. The tree graph shown in FIG. 2B has M=4 levels with a BPSK modulation value of P=2 (represented by 1 bits having 2^1=2 candidate values 1 and −1 per branch decision), although any integer number of M levels and any modulation number, P, may be used.

The maximum likelihood decoder may search tree graph 200 to determine the most likely solution e.g., a node 204 representing one element in a transmit vector $\overline{s}$ associated with a minimum difference or distance in equation (1) between H·$\overline{s}$ and the received vector $\overline{y}$ for that tree level 202, e.g., $\min_{\overline{s}} \|\overline{y} - H \cdot \overline{s}\|^2$. However, computing such distances for the trillions of possible solutions per second supported by wireless communications standards, such as, LTE advanced, is difficult.

QR decomposition may simplify the search distance computation by enabling incremental searches on the tree as opposed to evaluating the transmit vector $\overline{s}$ distance along the full tree path. Search distances may be derived, for example, according to equation (1), as $$\overline{y} = [\underline{h_1} \; \cdots \; \underline{h_M}] \begin{bmatrix} s_1 \\ \vdots \\ s_M \end{bmatrix} + \overline{n}.$$

Using QR decomposition, the channel matrix H is decomposed into matrices Q and R, such that: $=Q_{N \times M} R_{M \times N}$. Matrix Q is unitary such that: $Q^{-1}=Q^H(Q^H Q=I)$ and matrix R is an upper triangular matrix (e.g. having real entries along its main diagonal):

$$\begin{bmatrix} r_{11} & \cdots & r_{1n} \\ 0 & r_{22} & r_{2n} \\ \vdots & \ddots & \vdots \\ 0 & 0 & r_{nn} \end{bmatrix}$$

From equation (1), $\overline{y}=H\overline{s}+\overline{n}Q^H\overline{y}=Q^H QR\overline{s}+Q^H\overline{n}$:

$$\underbrace{Q^H \overline{y}}_{\tilde{y}} = R\overline{s} + \underbrace{Q^H \overline{n}}_{\tilde{n}},$$

where ñ-has the same statistics (e.g. the same covariance matrix $E[\overline{n}^H \overline{n}]$) as $\overline{n}$. According to this QR decomposition, conventional minimal distance search $\text{argmin}_{\overline{s}} \|\overline{y}-H\overline{s}\|^2$ may be translated to an equivalent, though simplified form, $\text{argmin}_s \|\bar{y}-R\bar{s}\|^2$ as follows:

$$\text{argmin}_s \|\bar{y}-H\bar{s}\|^2 \underset{eq.}{\Leftrightarrow} \text{argmin}_s \|\bar{\bar{y}}-R\bar{s}\|^2$$

Since matrix R is an upper triangular matrix, computing the squared distance ($\|\bar{\bar{y}}-H\bar{s}\|^2$), e.g. used for the distance increment measurement, may be reduced from a multi-dimensional problem using the channel matrix H to lower-dimensional problems using matrix R. From this point on the descriptions below $\bar{y}$ will be used instead of $\bar{\bar{y}}$.

To limit the number of candidate nodes and their distances to compute, a "sphere" decoder may be used, which searches tree graph 200 for a subset of nodes 204 that have an accumulated distance within a sphere of radius r (e.g. 205) centered at the received vector $\bar{y}$. The sphere decoder may select all nodes 204 with an accumulated distance within the sphere and may "prune" or discard all nodes 204 outside of the sphere.

The accumulated distance over the full tree search path may be, for example:

$$d^2(\hat{s}) = \|\bar{y} - R\bar{s}\|^2 = \sum_{i=0}^{M-1} m_i$$

The accumulated distance may be calculated in a recursive manner for a j-th level path (from a root node to a j-th level node) based on sequential $PED_i$'s for i=j+1, ... M−1, for example, solving each row of the matrix R, from the last row of R upwards to the first row of R as follows:

$$m_{M-1} = (y_{M-1} - r_{M-1,M-1} s_{M-1})^2$$
$$m_{M-2} = (y_{M-2} - r_{M-2,M-2} s_{M-2} - r_{M-1,M-2} \hat{s}_{M-1})^2, \text{ using } \hat{s}_{M-1}$$
$$\vdots$$
$$m_1 = (y_1 - r_{1,1} s_1 - r_{1,2} \hat{s}_2 - r_{1,3} \hat{s}_3 \ldots - r_{1,M-1} \hat{s}_{M-1})^2, \text{ using}$$
$$\hat{s}_2, \hat{s}_3, \ldots, \hat{s}_{M-1}$$
$$m_0 = (y_0 - r_{0,0} s_0 - r_{0,1} \hat{s}_1 - r_{0,2} \hat{s}_2 \ldots - r_{0,M-1} \hat{s}_{M-1})^2, \text{ using}$$
$$\hat{s}_1, \hat{s}_2, \hat{s}_3, \ldots, \hat{s}_{M-1}$$

An ith-level node may have an accumulated distance from the root node 201 to the leaf node 203 equal to a partial Euclidean distance ($PED_i$). The distance increment from that ith-level node to the next (i−1)-level node is $DI_{i-1}$. Partial Euclidean distance, $PED_i$, and distance increment, $DI_i$, may be computed, for example, as:

$$PED_i(\hat{s}_i, \hat{s}_{i+1}, \hat{s}_{M-1}) = \sum_{j=i}^{M-1} m_j, \; DI_i = m_i = \left( \underbrace{y_i - \sum_{j=i+1}^{M-1} r_{ij} \hat{s}_j}_{py_{ii}} - r_{ii} s_i \right)^2$$

where $py_{ii}$ is a function of ith-level measurement of the current level and higher levels j=i+1, ..., (M−1). This internal state variable, $py_{ii}$, may be generated in a recursive manner, for example, as described in reference to $PED_i$. The accumulated distance for each sequential branch decision $PED_{i-1}$ may be the sum of the previous level i accumulated distance $PED_i$ and the incremental distance (or branch length) from the selected node at level i, $\hat{s}_i$, to a selected node of the next level i−1, $s_{i-1}$, defined as:

$$PED_{i-1}(\hat{s}_{i-1}, \hat{s}_i, \hat{s}_{M-1}) = PED_i(\hat{s}_i, \hat{s}_{i+1}, \hat{s}_{M-1}) + DI_{i-1}$$

It should be noted that candidate symbol metric or Euclidian distance is a positive quantity, the same for distance increment DI, therefore $PED_i$ is a positive monotonic non-decreasing sequence.

Full path metric is defined as:

$$\text{metric} = d^2(s) = \|\bar{y} - H \cdot \bar{s}\|^2.$$

Partial metric is defined in the similar way using:

$$\text{partialMetric}(i) = PED_i(\hat{s}_i, \hat{s}_{i-1}, \hat{s}_i, \hat{s}_{M-1}).$$

Sphere decoder—based on using the pre-processing step described above or similar, transforming the MIMO detection to a problem of tree search. In order to control search complexity a sphere radius is introduced. Radius introduction imposes a $PED_i$ test vs. defined radius, so full/partial path with PED higher than the radius will be "pruned": a portion of the tree below that branch will not be explored, since the metrics of all the available paths are higher than the sphere radius value.

Tree scanning strategy (possible solution) applied is depth-first tree traversal, where at each level $s_i$ may be enumerate according to $DI_i$. Each selection is verified against sphere radius. In case of radius check violation all the paths beneath the tested branch are "pruned", since its accumulated distance will be greater than the specified sphere radius.

Radius management (possible solution): sphere radius is decreased each time a tree leaf is reached (full path from the root to the lowest level of the tree) having the smallest metric ($\|y-Hs\|^2$) seen so far in the search.

$$\text{metric}_{ML} = \|\bar{y} - H \cdot \bar{s}_{ML}\|^2$$

$$s_{ML} = [s_0, s_1, \ldots s_{M-1}]$$

$$b_{ML} = [b_0, b_1, \ldots b_{bps \cdot M-1}]$$

bps—bits per symbol (according to QAM setting)

The ML path can also be characterized by the sequence of $py_{ii}^{ML} = [py_0, py_1, \ldots py_{M-1}]$ The search radius is calculated: $R = \text{metric}_{ML} + LLR_{max}$ This way, all the paths with accumulated metric $PED_i > R$ will be pruned.

It is noted for the simplicity that bps is assumed as the same for all symbols of the transmitted M spacial steams $s_i$ Soft-Output MIMO Decoding ML MMO decoder defined above scans candidates' vectors to find:

$$s_{ML} = \text{argmin}_s \|\bar{y} - H \cdot \bar{s}\|^2$$

This type of decoder is referred as hard-output decoder, since it produces the certain values for all decoded QAM symbols or equivalently to all decoded bits. In modern communication system Forward error correction (FEC) technique is used, so the required output of MIMO decoder are LLRs (Log likelihood ratio) per bit and not the bit values ("0" or "1").

LLR is defined:

$$LLR(b_i) = \log \frac{P(b_i = \text{``1''} \mid y)}{P(b_i = \text{``0''} \mid y)}$$

Using MAX-LOG LLR approximation the LLR of each detected bit is given by:

$$LLR(b_i) = \frac{\min_{\{s \mid b_i = 0\}} \|\bar{y} - H\bar{s}\|^2 - \min_{\{s \mid b_i = 1\}} \|\bar{y} - H\bar{s}\|^2}{\sigma^2}$$

Soft output (LLR) information requires two paths (symbols) metrics to be found for each bit: the metric of the closest symbol where the bit equals "1" and the metric of the closest symbol where the bit equals "0". The sphere decoder traverses a symbol tree in search for required paths metrics.

Path metrics used to produce LLR for each decoded bit are stored and managed by means of two metrics tables. The number of entries in each table equals to the total number of bits to be decoded. First table stores the smallest metric found for a specific bit where the bit equals "1", while the second table stores the complementary information; the smallest symbol metric where the bit equals to "0". Tables update is performed each time search reaches a level of tree "leafs": metric of a full tree path from a root of the tree to leaf level becomes available.

Search ends when all the links or branches where either explored or pruned. Metrics tables' information available upon search termination are used to produce LLR values for each decoded bit. All the tables' entries are initialized with search initialization values (infinite metric) in the beginning of the search. In case the final metrics are different from initialization value, it still might be sub-optimal, due to pruning that prevented reaching the optimal path.

The main drawback of the scheme for soft decoding is the potential missing of counter-metrics. In addition to searching for $s_{ML}$, for each detected bit $b_i$ (s.t. i=0..bps·M−1) the best symbol with the negative value to $b_{ML[i]}$ is being searcher for. The metric of this symbol called counter-metrics for bit i.

ML metric and the ML counter-metrics for bit i (with addition of noise variance) may be the necessary inputs to LLR calculations In case one of the table entries contains search initialization value (infinite metric), default LLR value is assigned to that bit, that most probably not accurate enough.

The only available information in this case:

$$\text{counterMetric}(b_i) \geq R = \text{metric}_{ML} + LLR_{max}$$

$$LLR(b_i) \geq \frac{\pm(\text{metric}_{ML} - \text{metric}_{ML} + LLR_{max})}{\sigma^2} = \frac{\pm(LLR_{max})}{\sigma^2}$$

The trade-off is between reaching "best leafs" leading to optimal metrics in LLR tables and on the other hand achieving a minimal number of branch metrics evaluation (tree traverse cycle count).

Embodiments of the present invention involve using partial metric information of pruned path and prediction of remaining path metric to update LLR tables. The partial (pruned) path is "virtually augmented" to a complete symbol by adding an expected metric addition based on the best known ML metric. The estimated metric information is then used to update metrics tables' entries of the relevant bits.

Following is proposed sequence of steps according to one embodiment:

Step 1: Upon reaching a node at level i, where $PED_i \geq R$

Step 2: Part of the bits determined (according to the partial path): all the bits for levels M down to level i. Denote $b_{curr}[j]$ bits of the current path, only values at indexes $(i*bps) \leq j \leq ((M*bps-1))$ are valid. Counter-metrics of the following bits are candidates for update based on prediction and available partial metric information:

$$\text{Idx}_{discovered\_cand} = \{j \mid (i*bps) \leq j \leq ((M*bps-1)) \text{ AND } b_{curr}[j] \neq b_{ML}[j]\}$$

Counter-metrics of all the "un-discovered path" bits are also candidates for update based on prediction and available partial metric information:

$$\text{Idx}_{undiscovered\_cand} = \{j \mid 0 \leq j \leq ((i*bps-1))\}$$

Complete set of candidates:

$$\text{Idx}_{cand} = \text{Idx}_{discovered\_cand} \cup \text{Idx}_{undiscovered\_cand}$$

Step 3: Wherein the estimated metric used for candidates update for all the relevant candidates in $\text{Idx}_{cand}$:

$$PED_i + \text{delta}D$$

and wherein a non-limiting example for predicted metric augmentation:

$$\text{delta}D = \text{metric}_{ML} - PED_i^{ML}$$

Following is a non-limiting example for partial update flow: The following example will demonstrate the basic flow:

Assuming a 4×4 MIMO decoding setting. Each spatial layer is modulated QPSK: 2 bits per layer. Decoding aims to detect 8 bits: calculate 8 LLRs by managing metric tables of 8 entries each.

In the example below:

1. hypMetric and antiHypMetric are the mentioned above metric tables. The entries 0,1 are used for two bits of the first layer (0), entries 2,3 used for two bits of the second layer (1), etc.

2. MLbits holds the encoding of the best metric (ML metric) found during the search. Entries are either '0' or '1' according to the encoding of the symbol with the lowest metric found during the search (ML symbol).

3. MLaccumMetric holds incremental metrics for ML symbol. Entry 0 holds the accumulated metric from the root of the tree to layer 0, in the similar manner entry 1 holds the accumulated metric from the root of the tree to layer 1. The last entry holds the total metric of the ML symbol.

4. currPathAccumMetric holds accumulated metrics of current search path. Entry 0 hold the accumulated metric from the root of the tree to layer 0, in the similar manner entry 1 holds the accumulated metric from the root of the tree to layer 1, and so on. Each time a candidate symbol is being tested in a specific layer, new accumulated metric (from the root to the layer) causes update of the relevant entry.

5. currPathBits [8] holds the encoding of the current search path. Entries are either '0' or '1' according to the encoding of the symbols chosen along the search. Each time a possible symbol is being tested in a specific layer the corresponding bits updated.

6. currLayer—current search layer 7. sphereRadius— sphere radius for search management 8. approx_factor—factor used to correct a metric approximation used for "virtually augmented" path. The factor is parameter produced by a special algorithm. Possibility of using more complex "virtually augmentation" is also considered: more complicated prediction scheme.

The following notes should be taken into account:
1. hypMetric and antiHypMetric are updated each time currLayer reaches 4 or once partial update condition fulfilled.
2. TablesUpdate—is a function used to update hypMetric and antiHypMetric tables. Path metric and currPathBits are used to compare the stored values vs. current metric.

The respective pseudo code may be as the following example; other coding may be used:

```
double hypMetric[8]; // for metrics where bits '1'
double antiHypMetric[8]; // for metrics where bits '0'
double MLbits[8]
double MLAccumMetric[4];
double currPathAccumMetric[4]
double currPathBits [8];
int currLayer;
double sphereRadius;
double approx_factor;
...
// partial update condition
If (currPathAccumMetric[currLayer] > sphereRadius)
    // "virtually augmented" metric
    Approx_metric = currPathAccumMetric[currLayer]
                + approx_factor*( MLAccumMetric[4]-
                MLAccumMetric[currLayer])
    // call metric tables update
    TablesUpdate(hypMetric antiHypMetric,MLbits
,currLayer ,Approx_metric, currPathBits)
    // TablesUpdate function pseudo-code
    TablesUpdate(hypMetric antiHypMetric,, MLbits ,currLayer ,
    metric, currPathBits)
    For j=1:8
    If (currLayer == 4) or ( j/2 =< currLayer)
        If      currPathBits[j] == 0 && antiHypMetric[j] > metric
                antiHypMetric [j] = metric
        If      currPathBits [j] == 1 && hypMetric[j] > metric
                hypMetric[j] = metric
    else // for "un-discovered bits" update only anti-ML values.
        If      MLbits [j] == 1 && antiHypMetric [j] > metric
                antiHypMetric [j] = metric
        If      MLbits [j] == 0 && hypMetric [j] > metric
                hypMetric [j] = metric
```

Performance Evaluation

Using the proposed implementation/algorithm at the end of the search the number of LLRs assigned with default values is reduced; in addition some of the metrics get more reliable values based on "virtually augmented" paths compared to available explored full paths. In overall the produced LLRs using the proposed method are more accurate. The user may configure the conditions for which the table is updated based on the reliability of the estimation.

The improved search results in a higher precision result (closer to pure soft output ML performance) per given cycle count. Embodiments of the present invention may also be used to reach the same precision faster compared to search which does not utilize the partial metric information.

Simulation Results

The plots below are based on full baseband LTE-A link simulator, where Sphere decoder performance with the data enhancement of embodiments of the present invention and without it were evaluated. In the first chart performance measurements are PER (Packet Error Rate) as function of SNR (Signal to Noise Ratio) in MIMO 4×4 configuration over EPAS Channel model (3GPP standardized channel model) and Turbo code's code-rate is 5/6. System's target PER is $10^{-1}$.

Figure 3:
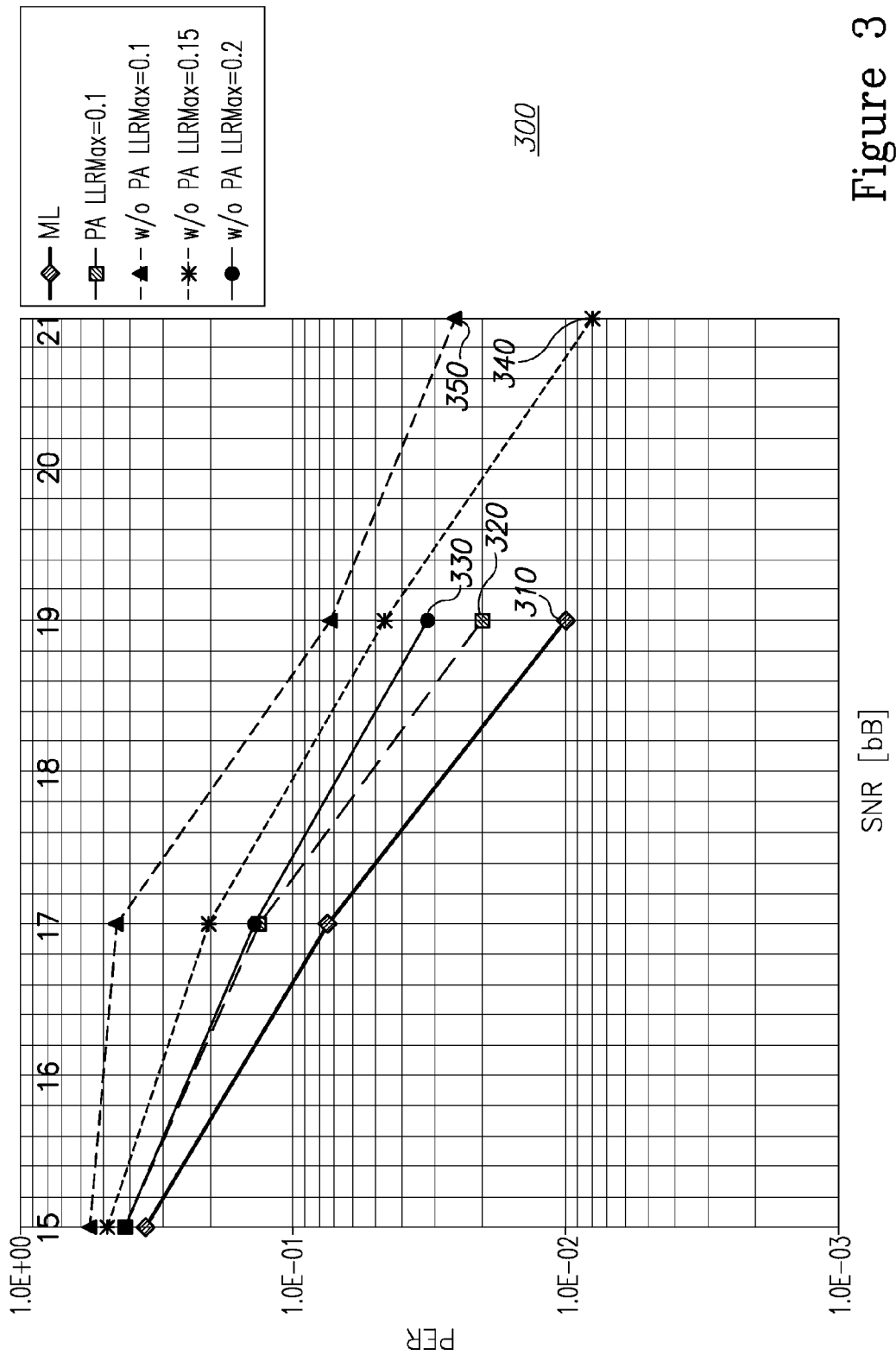
FIG. 3 is a graph plotting illustrating an aspect in accordance with an embodiment of the invention.

FIG. 3 shows a graph diagram 300 with the following lines:

Line 310 represents a full soft ML solution (used for performance reference).

Line 320 represents a sphere decoder with predicted augmentation (PA) in accordance with embodiments of the present invention and $LLR_{max}$=0.1

Line 350 represents a sphere decoder without predicted augmentation (PA) in accordance with embodiments of the present invention and $LLR_{max}$=0.1.

Line 340 represents a sphere decoder without predicted augmentation (PA) in accordance with embodiments of the present invention and $LLR_{max}$=0.15.

Line 330 represents a sphere decoder without predicted augmentation (PA) in accordance with embodiments of the present invention and $LLR_{max}$=0.2.

In order to achieve similar performance, in terms of PER, Sphere decoder without partial update in one embodiment mechanism has to work with bigger $LLR_{max}$. Choosing a larger $LLR_{max}$ may enable reaching more relevant nodes for LLR calculation on one hand and making the search longer on the other hand.

Figure 4:
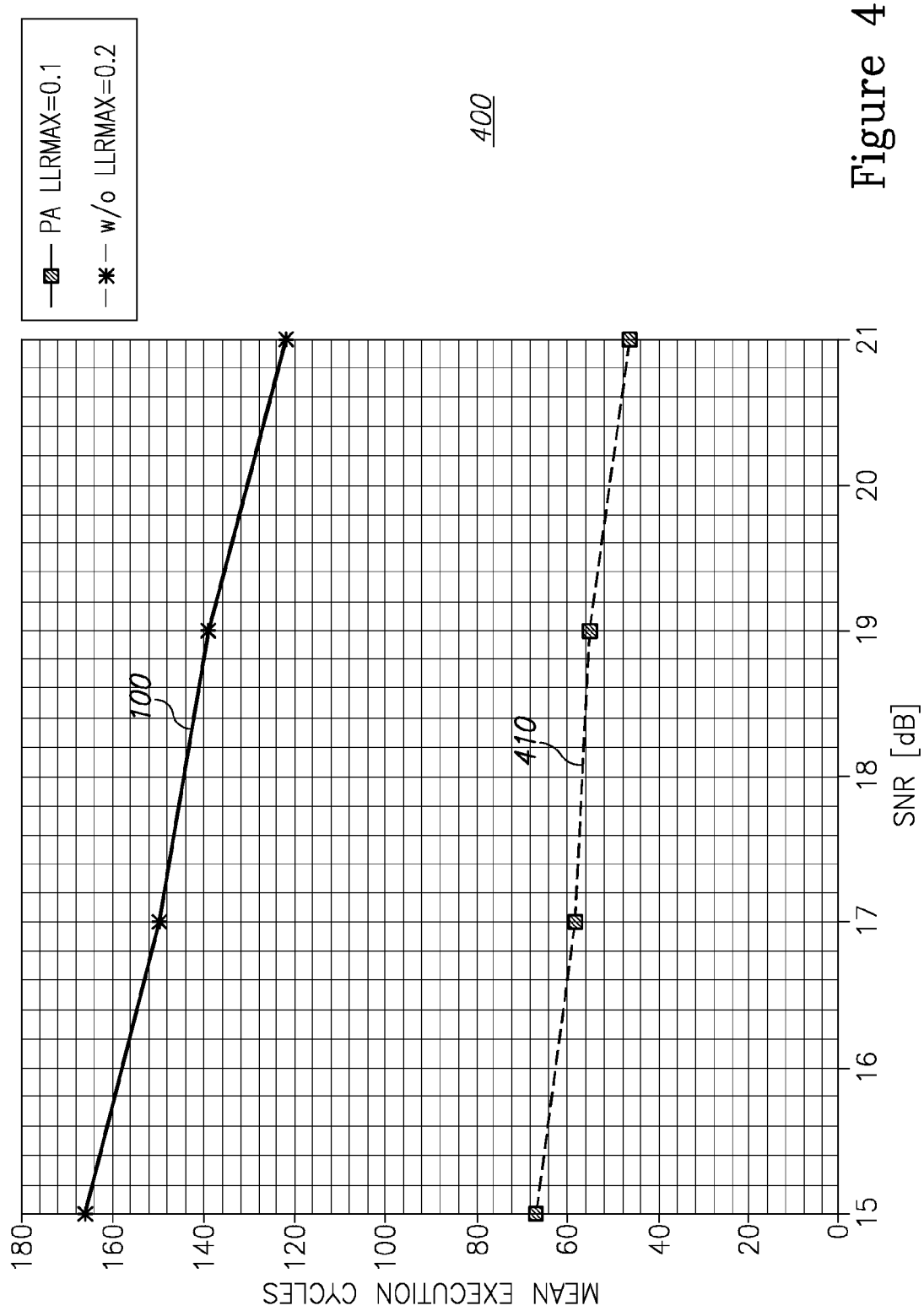
FIG. 4 is a graph plotting illustrating an embodiment of the invention.

In FIG. 4 a comparison 400 in execution cycles is presented, between two configurations: with and without predicted augmentation in accordance with embodiments of the present invention having almost the same performance in terms of PER vs. SNR:

line 410: represents a sphere decoder with predicted augmentation (PA) in accordance with embodiments of the present invention and $LLR_{max}$=0.1

Line 420: represents a sphere decoder without predicted augmentation (PA) in accordance with embodiments of the present invention and $LLR_{max}$=0.2

Figure 5:
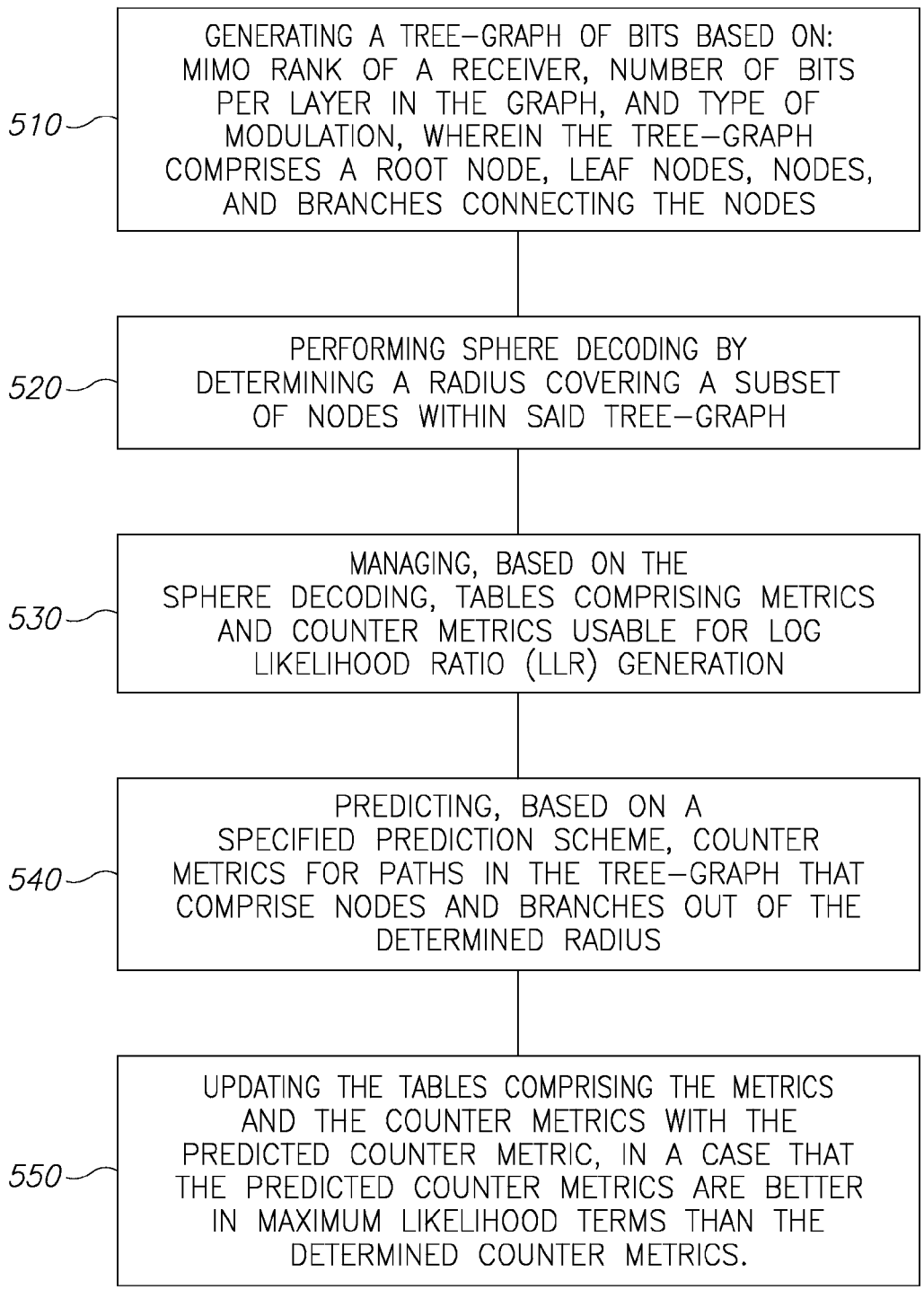
FIG. 5 is a high level flowchart illustrating a method in accordance with some embodiments of the present invention.

FIG. 5 is a high level flowchart illustrating a method 500 according to some embodiments of the present invention. Method 500 may include generating a tree-graph of bits based on: MIMO rank of the receiver, number of bits per layer, and type of modulation, wherein the tree-graph comprises a root node, leaf nodes, nodes, and links or branches connecting the nodes 510; performing sphere decoding by determining a radius covering a subset of nodes within said tree-graph 520; managing, based on the sphere decoding, tables comprising metrics and counter metrics usable for log likelihood ratio (LLR) generation 530; the term "managing" used herein is in the sense of a data structure that enables carrying out comparison of bits and apply the LLR algorithm easily from memory management point of view. Predicting, based on a specified prediction scheme (which may be any prediction scheme known in the art), counter metrics for paths in the tree-graph that comprise nodes and branches out of the determined radius 540; and updating the tables comprising the counter metrics with the predicted counter metric, in a case that the predicted counter metrics are better in maximum likelihood terms than the determined counter metrics 550. The term "better" used herein is in the sense of probability, e.g. the bit error rate (BER) is being reduced.

In order to achieve similar performance, in terms of PER, Sphere decoder without partial update mechanism in average spends ~2× more cycles of MIMO detection. This is equivalent to 2× (twice) longer processing latency or doubling hardware to meet same throughput requirements.

Other predictions are also may be used. According to some embodiments, the prediction scheme may be per tone and based on any path history that is available. Specifically, the prediction may be updated based on the historical data. The historical data may include the path history and also the relationship between previously discovered paths. The prediction scheme may also be per bit and is based on any path history that is available. In some other embodiments, the prediction scheme may be based on data from previous tones. Alternatively, the prediction scheme may be based on a priori data for a specified tone, such data may be, for example, the channel coding scheme being used. Furthermore, the prediction can be based on data from neighboring tones having a coherent bandwidth.

Embodiments of the invention may include an article such as a non-transitory computer or processor readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

As will be appreciated by one skilled in the art, embodiments of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of one or more inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that, where the claims or specification refer to "a" or "an" element, such reference is not be construed that there is only one of that element.

It is to be understood that, where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of soft output multiple-input-multiple-output (MIMO) decoding, the method comprising:
   generating a tree-graph of bits based on: MIMO rank of a receiver, number of bits per layer in the graph, and type of modulation, wherein the tree-graph comprises a root node, leaf nodes, nodes, and branches connecting the nodes;
   performing sphere decoding by determining a radius covering a subset of nodes within said tree-graph;
   managing, based on the sphere decoding, tables comprising metrics and counter metrics usable for log likelihood ratio (LLR) generation;
   predicting, based on a specified prediction scheme, predicted counter metrics for partial paths in the tree-graph that comprise nodes and branches outside the determined radius; and updating at least a portion of the tables comprising the metrics and the counter metrics with the predicted counter metrics when the predicted counter metrics are better in maximum likelihood terms than the counter metrics stored in the tables, wherein predicting a counter metric for a specific partial path in the tree-graph is done by adding a Euclidean distance of a full path with a lowest metric found (metric$_{ML}$) minus a partial Euclidean distance for a level i of the full path with the lowest metric found (PED$_i^{ML}$) to a partial Euclidean distance for level i of the specific partial path (PED$_i$) and i is an integer between 1 and the number of levels in the tree-graph.

2. The method according to claim 1, wherein the prediction scheme is per tone and based on using the full path having a lowest metric found so far.

3. The method according to claim 1, wherein the prediction scheme is per tone and based on any path history that is available.

4. The method according to claim 3, wherein managing or updating the prediction is based on historical data.

5. The method according to claim 1, wherein the prediction scheme is per bit and is based on any path history that is available.

6. The method according to claim 5, wherein managing or updating the prediction is based on the historical data comprising relationships between previously discovered paths.

7. The method according to claim 1, wherein the prediction scheme is based on data from neighboring tones having a coherent bandwidth.

8. The method according to claim 1, wherein the prediction scheme is based on a priori data for a specified tone, wherein the a priori data for the specified tone comprises a channel coding scheme.

9. The method according to claim 1, wherein updating comprises updating counter metrics of bits that are not discovered according to the specific partial path and counter metrics of bits that are discovered according to the specific partial path for bits in the specific partial path that have a bit value that does not equal a value of a corresponding bit in the full path with the lowest metric found.

10. The method according to claim 1, further comprising: generating LLRs for the bits based on the tables.

11. A system for soft output multiple-input-multiple-output (MIMO) decoding, the system comprising:
a graph generator configured to generate a tree-graph based on: MIMO rank, number of bits per layer, and type of modulation, wherein the tree-graph comprises a root node, leaf nodes, nodes, and branches connecting the nodes; and
a computer processor configured to:
perform sphere decoding by determining a radius covering a subset of nodes within said tree-graph;
manage, based on the sphere decoding, tables comprising metrics and counter metrics usable for log likelihood ratio (LLR) generation;
predict, based on a specified prediction scheme, predicted counter metrics for partial paths in the tree-graph that comprise nodes and branches outside the determined radius;
update at least a portion of the tables comprising the counter metrics with the predicted counter metrics when the predicted counter metrics are better in maximum likelihood terms than the counter metrics stored in the tables; and
generate LLRs for the bits based on the tables, wherein the computer processor is configured to predict a counter metric for a specific partial path in the tree-graph by adding a Euclidean distance of a full path with a lowest metric found (metric$_{ML}$) minus a partial Euclidean distance for a level i of the full path with the lowest metric found (PED$_i^{ML}$) to a partial Euclidean distance for level i of the specific partial path (PED$_i$) and i is an integer between 1 and the number of levels in the tree-graph.

12. The system according to claim 11, wherein the prediction scheme is per tone and based on using the full path having a lowest metric found so far.

13. The system according to claim 11, wherein the prediction scheme is per tone and based on any path history that is available.

14. The system according to claim 13, wherein managing or updating the prediction is based on the historical data.

15. The system according to claim 11, wherein the prediction scheme is per bit and is based on any path history that is available.

16. The system according to claim 15, wherein managing or updating the prediction is based on the historical data comprising relationships between previously discovered paths.

17. The system according to claim 11, wherein the prediction scheme is based on data from neighboring tones having a coherent bandwidth.

18. The system according to claim 11, wherein the prediction scheme is based on a priori data for a specified tone, wherein the a priori data for the specified tone comprises a channel coding scheme.

19. A non-transitory computer processor readable medium storing instructions which, when executed by a processor cause the processor to:
generate a tree-graph based on: MIMO rank, number of bits per layer, and type of modulation, wherein the tree-graph comprises a root node, leaf nodes, nodes, and branches connecting the nodes;
perform sphere decoding by determining a radius covering a subset of nodes within said tree-graph;
manage, based on the sphere decoding, tables comprising metrics and counter metrics usable for log likelihood ratio (LLR) generation;
predict, based on a specified prediction scheme, counter metrics for partial paths in the tree-graph that comprise nodes and branches outside the determined radius;
update at least a portion of the tables comprising the counter metrics with the predicted counter metrics when the predicted counter metrics are better in maximum likelihood terms than the counter metrics stored in the tables; and
generate LLRs for the bits based on the tables,
and predict a counter metric for a specific partial path in the tree-graph by adding a Euclidean distance of a full path with a lowest metric found (metric$_{ML}$) minus a partial Euclidean distance for a level i of the full path with the lowest metric found (PED$_i^{ML}$) to a partial Euclidean distance for level i of the specific partial path (PED$_i$) and i is an integer between 1 and the number of levels in the tree-graph.

* * * * *